United States Patent
Wang et al.

(10) Patent No.: US 10,159,078 B2
(45) Date of Patent: *Dec. 18, 2018

(54) ASSIGNING PHYSICAL-LAYER CELL IDENTITIES TO BASE STATIONS

(71) Applicant: Google LLC, Mountain View, CA (US)

(72) Inventors: Jibing Wang, San Jose, CA (US); Tibor Boros, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,473

(22) Filed: Dec. 12, 2017

(65) Prior Publication Data

US 2018/0103478 A1   Apr. 12, 2018

Related U.S. Application Data

(63) Continuation of application No. 15/281,045, filed on Sep. 29, 2016, now Pat. No. 9,894,659.

(51) Int. Cl.
  *H04W 24/02*  (2009.01)
  *H04W 72/04*  (2009.01)
  (Continued)

(52) U.S. Cl.
  CPC .......... *H04W 72/0473* (2013.01); *H04W 8/26* (2013.01); *H04W 76/11* (2018.02); *H04W 24/02* (2013.01); *H04W 88/08* (2013.01)

(58) Field of Classification Search
  CPC .......... H04W 72/0473; H04W 76/021; H04W 88/08
  See application file for complete search history.

(56) References Cited

U.S. PATENT DOCUMENTS 8,179,854 B2  5/2012  Claussen et al.
9,432,167 B2  8/2016  Garcia
(Continued)

FOREIGN PATENT DOCUMENTS

| WO | 2014086394 A1 | 6/2014 |
| WO | 2014086397 A1 | 6/2014 |
| WO | 2016074558 A1 | 5/2016 |

OTHER PUBLICATIONS

International Search Report and Written Opinion for the related application No. PCT/US2017/050366 dated Nov. 22, 2017.

*Primary Examiner* — Chuong A Ngo
(74) *Attorney, Agent, or Firm* — Honigman Miller Schwartz and Cohn LLP

(57) ABSTRACT

A method includes receiving a transmission power, a distance from a source base station, and physical cell identifications (PCIs) under mod3 and mod30. The method includes determining a mod3 cost associated with allocating the PCI to the source base station based on the transmit power and the distance of the corresponding neighboring base station, and determining an overall mod3 cost as a summation of the mod3 costs of the neighboring base stations having the same PCI under mod3. The method also includes determining a mod30 cost associated with allocating the PCI to the source base based on the transmit power and the distance of the corresponding neighboring base station, and determining an overall mod30 cost as a summation of the mod30 costs of the neighboring base stations having the same PCI under mod30. The method further includes allocating the PCI having the minimum overall cost to the base station.

30 Claims, 8 Drawing Sheets

(51) Int. Cl.
*H04W 76/11* (2018.01)
*H04W 8/26* (2009.01)
*H04W 88/08* (2009.01)

(56) References Cited

U.S. PATENT DOCUMENTS

| | | |
|---|---|---|
| 2015/0031961 A1 | 1/2015 | Freeman |
| 2015/0319624 A1 | 11/2015 | Garcia |
| 2016/0037550 A1* | 2/2016 | Barabell .............. H04B 17/318 455/450 |
| 2017/0048872 A1* | 2/2017 | Chiu .................... H04W 16/02 |

* cited by examiner

FIG. 4

Where: $P_1 = P_2$

400

120$i_a$ — Member of Set 1
Mod3 PCI=0
Mod30 PCI=0
P=P$_1$

120$i_b$ — Member of Set 1
Mod3 PCI=0
Mod30 PCI=0
P=P$_1$

120$i_c$ — Member of Set 2
Mod3 PCI=1
Mod30 PCI=1
P=P$_2$

120$i_d$ — Member of Set 2
Mod3 PCI=1
Mod30 PCI=1
P=P$_2$

120$i_e$ — Member of Set 1
Mod3 PCI=0
Mod30 PCI=0
P=P$_1$

120$i_f$ — Member of Set 2
Mod3 PCI=1
Mod30 PCI=1
P=P$_2$

120$i_g$ — Member of Set 1
Mod3 PCI=0
Mod30 PCI=0
P=P$_1$

120$i_h$ — Member of Set 1
Mod3 PCI=0
Mod30 PCI=0
P=P$_1$

120S

ASSIGNING PHYSICAL-LAYER CELL IDENTITIES TO BASE STATIONS

CROSS REFERENCE TO RELATED APPLICATIONS

This U.S. patent application is a continuation of, and claims priority under 35 U.S.C. § 120 from, U.S. patent application Ser. No. 15/281,045, filed on Sep. 29, 2016, which is hereby incorporated by reference in its entirety.

TECHNICAL FIELD

This disclosure relates to assigning physical-layer cell identities to base stations of a mobile telecommunication system.

BACKGROUND

Long-Term Evolution (LTE) is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different ratio interfaces in addition to core network improvements. LTE supports scalable carrier bandwidths, from 1.4 MHz to 20 MHz and supports both frequency division duplexing (FDD) and time-division duplexing (TDD).

In some 4G networks, such as an LTE network, a Physical-Layer Cell Identifier (PCI or Cell ID) can be used for cell identification and channel synchronization. Many 4G solutions utilize this PCI value to uniquely identify a base station node.

SUMMARY

One aspect of the disclosure provides a method for allocating a physical cell identifier (PCI) having a minimum overall cost to a source base station. The method includes receiving, at data processing hardware, for each neighboring base station of the source base station: a transmission power; a pairwise Euclidean distance from the source base station; a physical cell identification (PCI) under mod3; and a physical cell identification (PCI) under mod30. For each PCI available for allocation to the source base station under mod3, the method includes, for each neighboring base station having the same PCI under mod3, determining, by the data processing hardware, a mod3 cost associated with allocating the PCI to the source base station based on the transmit power and the pairwise Euclidean distance of the corresponding neighboring base station. The method further includes determining, by the data processing hardware, an overall mod3 cost as a summation of the mod3 costs of the neighboring base stations having the same PCI under mod3. For each neighboring base station having the same PCI under mod30, the method includes determining, by the data processing hardware, a mod30 cost associated with allocating the PCI to the source base station based on the transmit power and the pairwise Euclidean distance of the corresponding neighboring base station. The method also includes determining, by the data processing hardware, an overall mod30 cost as a summation of the mod30 costs of the neighboring base stations having the same PCI under mod30. For each PCI available for allocation to the source base station, the method includes determining, by the data processing hardware, an overall cost as a summation of the corresponding overall mod3 cost and the corresponding overall mod30 cost. The method further includes determining, by the data processing hardware, which PCI available for allocation to the source base station has a minimum overall cost, and allocating, by the data processing hardware, the PCI having the minimum overall cost to the source base station.

Implementations of the disclosure may include one or more of the following optional features. In some implementations, the method includes determining the overall mod3 cost as the summation of the mod3 of the neighboring base stations having the same PCI under mod3. The method may also include determining the overall mod30 cost as the summation of the mod30 costs of the neighboring base stations having the same PCI under mod30. The method may further include determining the overall mod30 cost as the summation of the mod30 costs of the neighboring base stations having the same PCI under mod30. The method may also include determining the overall cost as the summation of the corresponding overall mod30 and the corresponding overall mod30 cost.

In some examples, when multiple PCIs available for allocation to the source base station have the same minimum overall cost, the method includes randomly selecting, by the data processing hardware, one of the multiple PCIs having the same minimum overall cost, and allocating, by the data processing hardware, the selected one of the multiple PCIs having the same minimum overall cost to the source base station. For each set of neighboring base stations having the same PCI under mod30, the method may include determining, by the data processing hardware, which neighboring base station comprises a minimum pairwise Euclidean distance from the source base station. The method may also include determining, by the data processing hardware, which PCI available for allocation to the source base station under mod30 is associated with the neighboring base station having a greatest minimum Euclidean distance, and allocating, by the data processing hardware, the PCI under mod30 associated with the neighboring base station having the greatest minimum Euclidean distance to the source base station.

After allocating the PCI having the minimum overall cost to the source base station, the method may include receiving, at data processing hardware, for each neighboring base station of a new source base station: a transmission power; a pairwise Euclidean distance from the new source base station; a PCI under mod3; and a PCI under mod30. For each PCI available for allocation to the new source base station under mod3, the method may include for each neighboring base station of the new source base station having the same PCI under mod3, determining, by the data processing hardware, a mod3 cost associated with allocating the PCI to the new source base station based on the transmit power and the pairwise Euclidean distance of the corresponding neighboring base station. The method may also include determining, by the data processing hardware, an overall mod3 cost as a summation of the mod3 costs of the neighboring base stations having the same PCI under mod3 and determining, by the data processing hardware, which PCI available for allocation to the new source base station under mod3 has a minimum overall mod3 cost. The method may further include allocating, by the data processing hardware, the PCI under mod3 having the minimum overall mod3 cost to the new source base station.

In some implementations, the method includes determining, by the data processing hardware, a reduced set of PCIs available for allocation to the new source base station under mod30 based on the PCI under mod3 having the minimum overall mod3 cost allocated to the new source base station. For each PCI under mod30 from the reduced set of PCIs available for allocation to the new source base station under mod30, the method includes, for each neighboring base station having the same PCI under mod30, determining, by the data processing hardware, a mod30 cost associated with allocating the PCI to the new source base station based on the transmit power and the pairwise Euclidean distance of the corresponding neighboring base station. The method may also include determining, by the data processing hardware, an overall mod30 costs as a summation of the mod30 costs of the neighboring base stations having the same PCI under mod30. The method may further include determining, by the data processing hardware, which PCI under mod30 from the reduced set of PCIs available for allocation to the new source base station under mod30 has a minimum overall mod30 cost and allocating, by the data processing hardware, the PCI under mod30 having the minimum overall mod30 cost to the new source base station. The source base station may include a three-sector site providing three cells directed to different directions. The source base station may include one of a two-sector site or a single-sector site.

Another aspect of the disclosure provides a network system including a source base station and neighboring base stations of the source base station. The network system also includes data processing hardware in communication with the source base station and memory hardware in communication with the data processing hardware. The memory hardware stores instructions that when executed on the data processing hardware, cause the data processing hardware to perform operations. The operations include receiving, for each neighboring base station of a source base station: a transmission power; a pairwise Euclidean distance from the source base station; a physical cell identification (PCI) under mod3; and a physical cell identification (PCI) under mod30. For each PCI available for allocation to the source base station under mod3, for each neighboring base station having the same PCI under mod3, the operations include determining a mod3 cost associated with allocating the PCI to the source base station based on the transmit power and the pairwise Euclidean distance of the corresponding neighboring base station and determining an overall mod3 cost as a summation of the mod3 costs of the neighboring base stations having the same PCI under mod3. For each PCI available for allocation to the source base station under mod30, for each neighboring base station having the same PCI under mod30, the operations include determining a mod30 cost associated with allocating the PCI to the source base station based on the transmit power and the pairwise Euclidean distance of the corresponding neighboring base station and determining an overall mod30 cost as a summation of the mod30 costs of the neighboring base stations having the same PCI under mod30. For each PCI available for allocation to the source base station, the operations include determining an overall cost as a summation of the corresponding overall mod3 cost and the corresponding overall mod30 cost, determining which PCI available for allocation to the source base station has a minimum overall cost, and allocating the PCI having the minimum overall cost to the source base station.

This aspect may include one or more of the following optional features. In some implementations, the network system includes determining an overall mod3 cost as the summation of the mod3 costs of the neighboring base stations having the same PCI under mod3. The network system may also include determining the overall mod3 cost as the summation of the mod3 costs of the neighboring base stations having the same PCI under mod3. The network system may further include determining the overall mod30 cost as the summation of the mod30 costs of the neighboring base stations having the same PCI under mod30. The network system may also include determining the overall mod30 cost as the summation of the mod30 costs of the neighboring base stations having the same PCI under mod30. The method may also include determining the overall cost as the summation of the corresponding overall mod3 cost and the corresponding overall mod30 cost.

In some examples, the operations include, when multiple PCIs available for allocation to the source base station have the same minimum overall cost, randomly selecting one of the multiple PCIs having the same minimum overall cost and allocating the selected one of the multiple PCIs having the same minimum overall cost to the source base station. For each set of neighboring base stations having the same PCI under mod30, the operations may include determining which neighboring base station includes having a greatest Euclidean distance and allocating the PCI under mod30 associated with the neighboring base station having the greatest minimum Euclidean distance to the source base station.

After allocating the PCI having the minimum overall cost to the source base station, the operations include receiving, for each neighboring base station of a new source base station: a transmission power; a pairwise Euclidean distance from the new source base station; a PCI under mod3; and a PCI under mod30. For each PCI available for allocation to the new source base station under mod3, for each neighboring base station of the new source base station having the same PCI under mod3, the operations may include determining a mod3 cost associated with allocating the PCI to the new source base station based on the transmit power and the pairwise Euclidean distance of the corresponding neighboring base station, and determining an overall mod3 cost as a summation of the mod3 costs of the neighboring base stations having the same PCI under mod3. The operations may further include determining which PCI available for allocation to the new source base station under mod3 has a minimum overall mod3 cost and allocating the PCI under mod3 having the minimum overall mod3 cost to the new source base station.

In some examples, the operations include determining a reduced set of PCIs available for allocation to the new source base station under mod30 based on the PCI under mod3 having the minimum overall mod3 cost allocated to the new source base station. For each PCI under mod30 from the reduced set of PCIs available for allocation to the new source base station under mod30, the operations include: for each neighboring base station having the same PCI under mod30, determining a mod30 cost associated with allocating the PCI to the new source base station based on the transmit power and the pairwise Euclidean distance of the corresponding neighboring base station; and determining an overall mod30 cost as a summation of the mod30 costs of the neighboring base stations having the same PCI under mod30. The operations may also include determining which PCI under mod30 from the reduced set of PCIs available for allocation to the new source base station under mod30 has a minimum overall mod30 cost and allocating the PCI under mod30 having the minimum overall mod30 cost to the new source base station. The source base station may include a three-sector site providing three cells directed to different locations. The source base station may also include one of a two-sector site or a single-sector site.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a schematic view of an example network environment including a source base station and multiple base stations equidistant from the source base station and having the same transmission power.

Like reference symbols in the various drawings indicate like elements.

DETAILED DESCRIPTION

Long Term Evolution (LTE) networks use a single frequency for communicating data between user equipment (UE), such as mobile phones, and base stations, typically providing three cells of coverage in different directions to the UEs. As a result, the overlapping of cells of the same frequency is often inevitable in LTE networks. A physical-layer cell identifier (PCI or Cell ID) value is used to uniquely identify each cell provided by each base station. For optimal performance of an LTE network, it is desirable to allocate a base station a different PCI under modulo 3 than that of its neighbors to avoid collisions between downlink reference signals. Moreover, it is also desirable to allocate the base station a different PCI under modulo 30 than that of its neighbors to avoid collisions over uplink demodulation reference signal sequences to assist with channel estimation. Implementations herein are directed toward first analyzing the costs associated with allocating a given PCI under modulo 3 and a given PCI under modulo 30 to the base station and then select a PCI for allocation to the base station that is associated with the minimum cost under both PCI under modulo 3 and PCI under modulo 30.

Figure 1A:
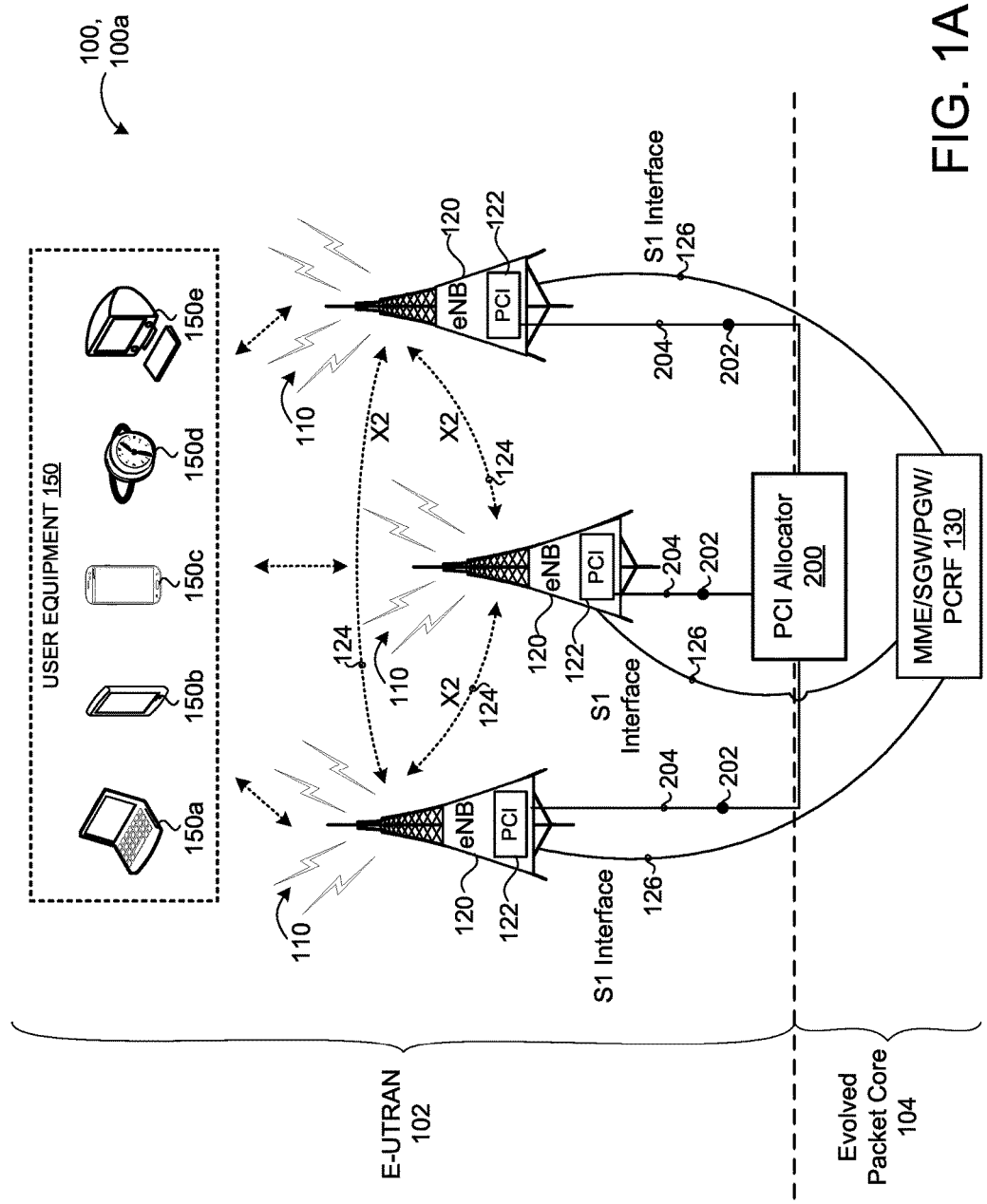
FIG. 1A is a schematic view of an example wireless network including an evolved packet core in communication with user equipment via one or more base stations.
Figure 1B:
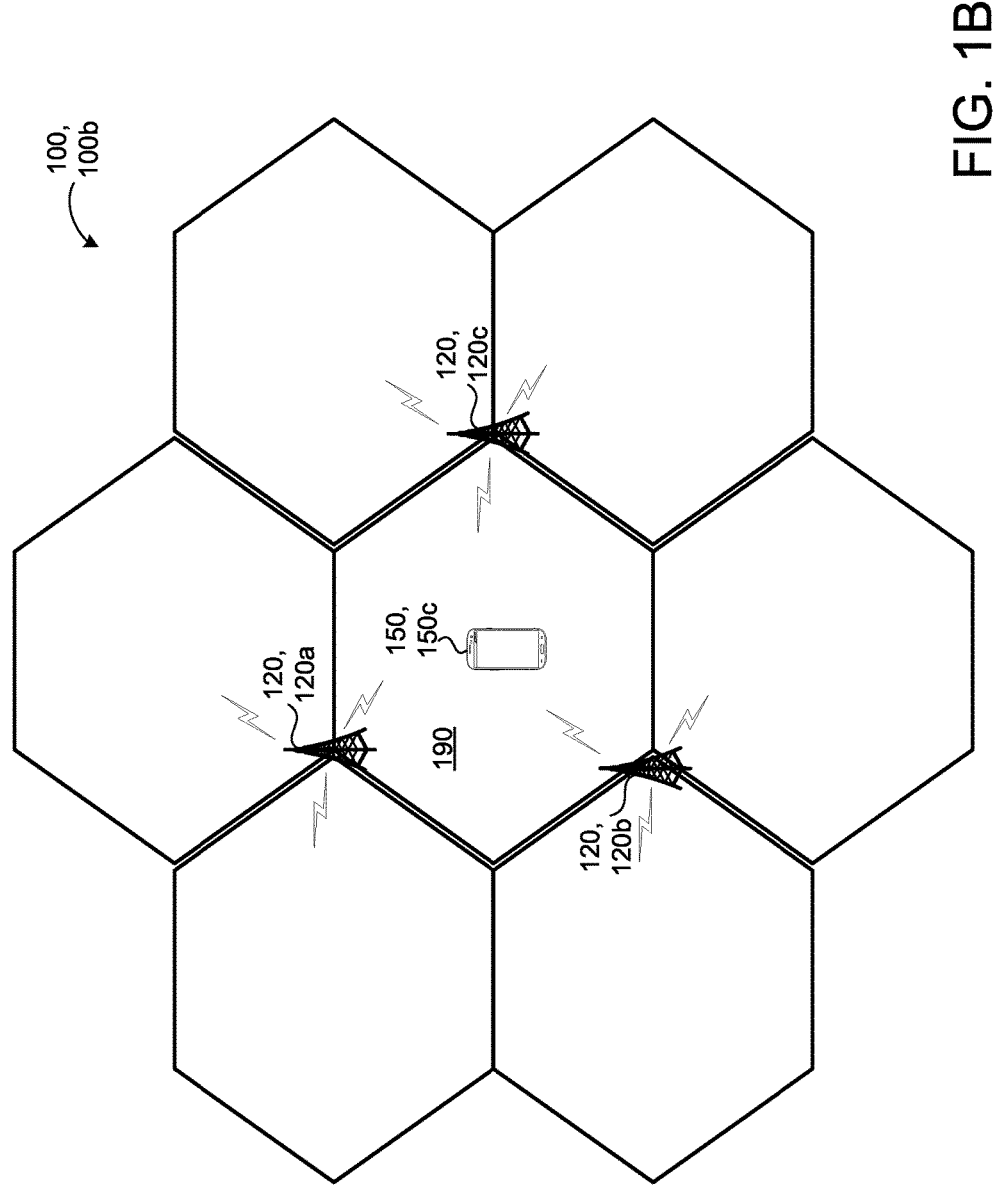
FIG. 1B is a schematic view of an example wireless network showing user equipment located in an area where three cells of coverage overlap.

FIGS. 1A and 1B show schematic views of an example LTE network 100, 100a-b. The LTE network 100 may be a LTE Time-Division Duplex (LTE-TDD) network, which may also be referred to as Time-Division Long-Term Evolution (TD-LTE), and is a 4G telecommunication technology and standard co-developed by an international coalition of companies. The LTE-TDD network 100 uses a single frequency for uploading and downloading information. Therefore, the upload and download times alternate. In some examples, the ratio of uploads versus downloads are changed dynamically, based on the amount of data being uploaded versus the amount of data being downloaded. LTE-TDD networks 100 operate at frequencies ranging from 1850 MHz to 3800 MHz, with several different bands being used.

Referring to FIG. 1A, the LTE network 100 includes a first portion, an Evolved Universal Terrestrial Radio Access Network (e-UTRAN) portion 102, and a second portion, an Evolved Packet Core (EPC) portion 104. The first portion 102 includes an air interface 110 (i.e., Evolved Universal Terrestrial Radio Access (e-UTRA)) of 3GPP's LTE upgrade path for mobile networks, user equipment 150, and multiple base stations 120 (e.g., Evolved node B cells (eNBs)). The LTE air interface 110 uses orthogonal frequency-division multiple access (OFDMA) radio-access for the downlink and Single-carrier FDMA (SC-FDMA) for the uplink.

The EPC 104 is a framework for providing converged voice and data on the LTE-TDD network 100. EPC 104 unifies voice and data on an Internet Protocol (IP) service architecture and voice is treated as just another IP application. The EPC 104 includes several components 130 such as, but are not limited to, Mobility Management Entity (MME), Serving Gateway (SGW), Packet Data Node Gateway (PGW), and Policy and Charging Rules Function (PCRF).

The MME is a key control-code for the LTE network 100. The MME manages session and states and authenticates and tracks user equipment (UE) 150 across the network 100. The SGW is responsible for routing packets through the network 100. The PGW is an interface between the LTE network 100 and other packet data networks, manages quality of service (QoS), and provides deep packet inspection (DPI). The PCRF supports service data flow detection, policy enforcement, and flow-based charging.

An Evolved node B 120 (also referred as eNode B, eNB or a cell) is hardware that connects to the mobile phone network (i.e., the air interface 110) and communicates directly with the UEs 150. The eNB 120 does not have a separate controller element, thus simplifies the architecture of the network 100. The eNB 120 uses the E-UTRA protocols OFDMA (downlink) and SC-FDMA (uplink). In addition, the eNB 120 embeds its own control functionality, since it does not include a separate controller element. The eNB 120 uses multiple protocols when interfacing with different elements. For example, the eNB 120 uses an X2-interface 124 when communicating with other eNBs 120 in the network 100 and uses an S1 interface 126 for communicating with the EPC 104.

UEs 150 may be any telecommunication device that is capable of transmitting and/or receiving voice/data over the network 100. UEs 150 may include, but are not limited to, mobile computing devices, such as laptops 150a, tablets 150b, smart phones 150c, and wearable computing devices 150d (e.g., headsets and/or watches). UEs 150 may also include other computing devices having other form factors, such as computing devices included in desktop computers 150e, vehicles, gaming devices, televisions, or other appliances (e.g., networked home automation devices and home appliances).

Referring to FIG. 1B, in some implementations, the LTE network 100, 100b is a single-frequency network having a plurality of cells (e.g., each cell is represented by a hexagonal block). As the reuse of frequencies may not be an option in the single-frequency network 100, the overlap of cells of a same frequency may be inevitable. In some examples, the typical cell planning of the network 100 is based on three-sector sites, such as eNBs 120a, 120b, and 120c, where each eNB 120a-c provides three cells directed to different directions. In other configurations, the network 100 may include two-sector sites and/or omni-directional (single-sector) sites.

Each of the three sectors (e.g., three cells provided by each eNB 120) may have a physical-layer cell identifier (PCI or Cell ID) value used for cell identification and channel synchronization. The LTE network 100 may utilize this PCI value to uniquely identify an eNB 120. The PCI can be divided into two parts of one physical layer cell ID group value $N_{ID1}$ and one physical layer cell ID sector value $N_{ID2}$. The PCI group value $N_{ID1}$ can have a range from zero to one hundred and sixty-seven $\{0, 1, \ldots, 167\}$. The PCI sector value $N_{ID2}$ can have a range from zero to two $\{0, 1, 2\}$. Thus, there are five hundred and four unique PCI values, e.g., $PCI=(3 \times N_{ID1})+N_{ID2}$.

In some implementations, the PCI group value $N_{ID1}$ defines a secondary synchronization sequence (SSS) and the PCI sector value $N_{ID2}$ defines a primary synchronization sequence (PSS), corresponding to first, second, and third PSS groups on a basis of PCI modulo 3 (PCI mod3). Members of the same PCI mod3 group/set have the same PCI value under mod3, e.g., either 0, 1, or 2, and therefore, cells with the same PCI under mod3 in the single-frequency LTE network 100 have the same PSS sequence. Moreover, the cells may also have the same time-frequency location of the cell-specific reference signals (CRS). Additionally, a PCI value under modulo 30 (PCI mod30) may be assigned to each cell within the network 100 for avoiding uplink reference signal collisions, such as collisions of physical uplink control channel (PUCCH) demodulation reference signals (DMRS). These PUCCH DMRS sequences may be divided into thirty groups. Members of the same PCI mod30 group/set have the same PCI value under mod30 ranging from zero to twenty-nine $\{0, 1, \ldots, 29\}$. Thus, for cells with the same PCI value under mod30, the cells may have the same DMRS sequence group number.

Cell synchronization may be the very first step when user equipment 150 wants to camp on a given cell. From the synchronization, the UE 150 (e.g., smart phone 150c) acquires the PCI, time slot and frame synchronization, which may enable the UE 150 to obtain system information blocks (SIB) from the network 100. During the synchronization, the UE 150 may first find the PSS for obtaining the PCI sector value $N_{ID2}$ (e.g. a value from a group $\{0, 1, 2\}$). Thereafter, the UE 150 may acquire the SSS symbols to obtain the physical layer cell ID group value $N_{ID1}$ (e.g. a value from a group $\{0, 1 \ldots, 167\}$). Using the $N_{ID1}$ and the $N_{ID2}$, the UE 150 may acquire knowledge of the PCI for the cell. Once the UE 150 knows the PCI value for the cell, it may also know the location of the cell-specific reference signals (CRS) used in channel estimation, cell selection/reselection and handover procedures.

In view of the foregoing, assigning PCI values (e.g. assign the $N_{ID1}$ and the $N_{ID2}$ for the cells) is important from the point of view of avoiding collisions over the network 100. For instance, FIG. 1B shows the UE 150 located in an area 190 in which each of the eNBs 120a-c provides coverage to the area. In other words, three cells overlap in the area 190 where the UE 150 is located. In some examples, some of the overlapping cells in the area 190 have the same $N_{ID1}$ and/or $N_{ID2}$. As a result, during synchronization in the network 100, the overlap of the PSSs and/or the SSSs from different eNBs 120a-c may cause significant degradation in the detection of the eNBs 120a-c. This may lead to poor key performance indicators (KPIs), especially for UEs 150 at the cell-edge. Each eNB 120 (e.g. base station) can have a node specific PCI value. Generally, it is desirable for an eNB 120 of interest to have a different PCI value than a neighbor eNB 120 and a neighbor's neighbor eNB 120. However, in single-frequency LTE networks 100 having multiple cells, reuse of frequencies may not be an option and, thus, the overlap of cells of the same frequency may be inevitable.

Referring back to FIG. 1A, in some implementations, the LTE network 100 includes a PCI allocator 200 for allocating PCIs 202 to the eNBs 120 of the network 100 based on minimizing a cost associated with modulo 3 and modulo 30 constraints. The PCI allocator 200 may execute on a distributed system or a standalone server in the network 100. For instance, the PCI allocator 200 may be part of the E-UTRAN portion 102 of the network 100 or the EPC portion 104 of the network 100 and may communicate with each eNB 120 over a communication interface 204 for allocating a corresponding PCI to each eNB 120. In some examples, the eNB 120 includes a port 122 for receiving an allocated PCI value from the PCI allocator 200 via the communication interface 204. In some examples, the communication interface 204 includes the S1 interface 126. In some implementations, the PCI allocator 200 resides in the E-UTRAN portion 102 and communicates with the eNBs 120 via the X2-interface 124 or the air interface 110. In some examples, among one or more PCIs 202 available for allocation to a source base station 120S (FIG. 2), the PCI allocator 200 allocates the PCI 202 to the source base station 120S that minimizes both mod3 costs having the same PCI under mod3 and mod30 costs having the same PCI under mod30.

Figure 2:
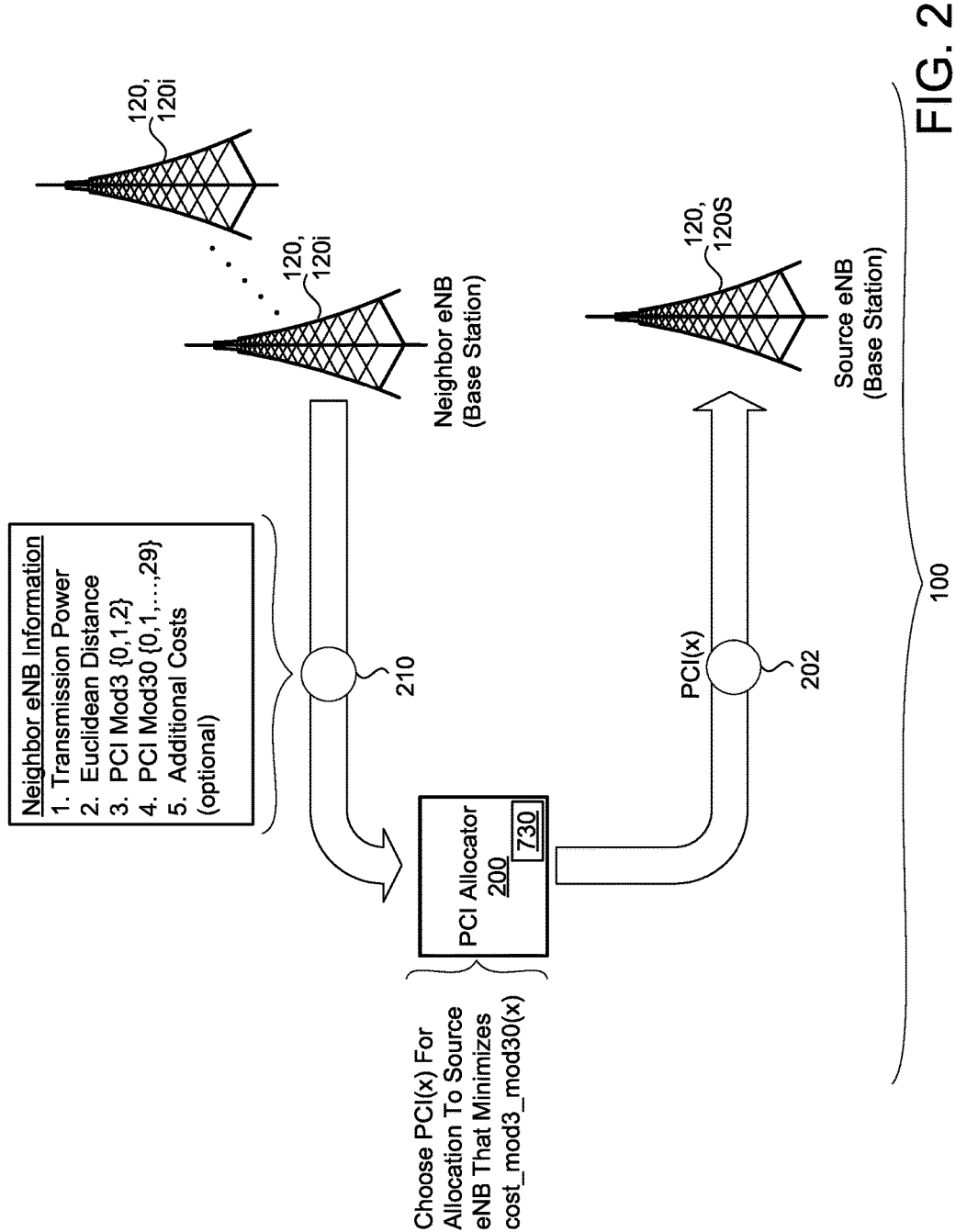
FIG. 2 is a schematic view of an example Physical-Layer Cell Identifier (PCI) allocator allocating a PCI to a source base station based on base station information for neighboring base stations.

Referring to FIG. 2, in some implementations, the PCI allocator 200 receives eNB information 210 (e.g., base station information) for each neighboring eNB 120i of a source eNB 120S in the network 100. While the example shows the PCI allocator 200 receiving the eNB information 210 directly from each neighboring eNB 120i, the PCI allocator 200 may receive the eNB information 210 by retrieval from memory hardware 720 in communication with the PCI allocator 200. For instance, the memory hardware 720 may store the eNB information 210 for each eNB 120 of the network 100 and the PCI allocator 200 may retrieve the eNB information 210 as needed, e.g., when allocating a PCI 202 to a source eNB 120S. In some examples, a UE 150 obtains the eNB information 210 from an eNB 120 when the eNB 120 is providing coverage to the UE 150. The UE 150 may then report the eNB information 210 to the PCI allocator 200 for storage in the memory hardware 720. For each neighboring eNB 120i of the source eNB 120S, the eNB information 210 may include, without limitation, a transmission power P, a pairwise Euclidean distance d between the corresponding neighboring eNB 120i and the source eNB 120S, a PCI under mod3, and a PCI under mod30. For instance, each neighboring eNB 120i has a PCI under mod3 equal to 0, 1, or 2 and a PCI under mod30 equal to 0, 1, . . . , or 29.

The eNB information 210 may additionally or alternatively include additional costs related to the corresponding neighboring eNB 120i including at least one of hardware costs, software costs, or operational costs. As used herein, operational costs may include maintenance costs, power costs, and/or real estate costs. For instance, eNBs 120 mounted on top of a skyscraper are associated with higher maintenance costs compared to the maintenance costs for eNBs 120 located on ground level. Moreover, power costs, such as energy rates offered by a provider, may differ from location to location.

In some implementations, the PCI allocator 200 chooses a value of PCI(x) 202 for allocation to the source eNB 120S that minimizes an overall cost to the source eNB 120S based on an overall mod3 cost and an overall mod30 cost. As will become apparent, allocating the PCI(x) 202 having the minimum overall cost to the source eNB 120s optimizes uplink and downlink performance of the source eNB 120s by avoiding interference/collisions with the neighboring eNBs 120i.

The PCI allocator 200 determines the overall cost to the source eNB 120S for each PCI(x) available for allocation to the source eNB 120S by defining a cost function for any PCI(x) using the following equation:

$$\text{cost\_mod3\_mod30}(x) = W1 * \text{cost\_mod3}(x) + W2 * \text{cost\_mod30}(x) \tag{1}$$

where cost_mod3_mod30(x) is the overall cost for the corresponding PCI(x), cost_mod3(x) is an overall mod3 cost of neighboring eNBs 120i having the same PCI under mod3, cost_mod30(x) is an overall mod30 cost of neighboring eNBs 120i having the same PCI under mod30, W1 is a weight applied to the overall mod3 cost, and W2 is weight applied to the overall mod30 cost.

In some implementations, the PCI allocator 200 determines a mod3 cost for each neighboring eNB 120i having a same PCI(x) under mod3. Here, the mod3 cost is associated with allocating the corresponding PCI(x) to the source eNB 120S based on the transmit power and the pairwise Euclidean distance of the corresponding neighboring eNB 120i. After determining the mod3 cost for all of the neighboring eNBs 120i having the same PCI(x) under mod3, the PCI allocator 200 may determine the overall mod3 cost as a summation of the mod3 costs of the neighboring eNBs 120i having the same PCI under mod3. Accordingly, the PCI allocator 200 may determine the overall mod3 cost of the neighboring eNBs 120i having the same PCI(x) under mod3 using the following equation:

$$\text{cost\_mod3}(x) = \Sigma_{i \in \Delta_x} P_i * d_i^{-2} \tag{2A}$$

where x is the corresponding PCI under mod3, i is the corresponding neighboring base station, $\Delta_x$ is a set of the neighboring eNBs having the corresponding PCI under mod3, $P_i$ is the transmit power of the corresponding neighboring eNB, and $d_i$ is the pairwise Euclidean distance of the corresponding neighboring eNB. Thereafter, the PCI allocator 200 may determine the overall mod3 costs for each remaining PCI(x) available for allocation to the source eNB 120S under mod3. For instance, the PCI allocator 200 may determine overall mod3 costs for PCI(x) equal to 0, 1, and/or 2.

In some configurations, when determining the overall mod3 cost, the PCI allocator 200 takes into consideration the additional costs associated with each neighboring eNB 120i having the same PCI(x) under mod3 using the following equation:

$$\text{cost\_mod3}(x) = \Sigma_{i \in \Delta_x} P_i * d_i^{-2} + C_i \tag{2B}$$

where $C_i$ are the additional costs associated with the corresponding neighboring eNB 120i.

Similar to determining the overall mod3 cost using Eq. (2A), the PCI allocator determines a mod30 cost for each neighboring eNB 120i having a same PCI(x) under mod30. The mod30 cost is associated with allocating the corresponding PCI(x) to the source eNB 120S based on the transmit power and the pairwise Euclidean distance of the corresponding neighboring eNB 120i. After determining the mod30 cost for all of the neighboring eNBs 120i having the same PCI(x) under mod30, the PCI allocator 200 may determine the overall mod30 cost as a summation of the mod30 costs of the neighboring eNBs 120i having the same PCI under mod30. Accordingly, the PCI allocator 200 may determine the overall mod30 cost of the neighboring eNBs 120i having the same PCI(x) under mod30 using the following equation:

$$\text{cost\_mod30}(x) = \Sigma_{i \in \theta_x} P_i * d_i^{-2} \tag{3A}$$

where x is the corresponding PCI under mod30 and $\theta_x$ is a set of the neighboring eNBs 120i having the corresponding PCI under mod30. Thereafter, the PCI allocator 200 may determine the overall mod30 costs for each remaining PCI(x) available for allocation to the source eNB 120S under mod30. For instance, the PCI allocator 200 may determine overall mod30 costs for PCI(x) equal to 0, 1, . . . , and/or 29.

In some configurations, when determining the overall mod3 cost, the PCI allocator 200 takes into consideration the additional costs associated with each neighboring eNB 120i having the same PCI(x) under mod3 using the following equation:

$$\text{cost\_mod30}(x) = \Sigma_{i \in \theta_x} P_i * d_i^{-2} + C_i \tag{3B}$$

where $C_i$ are the additional costs associated with the corresponding neighboring eNB 120i.

Upon determining the overall mod3 cost (e.g., using EQ. 2A or EQ. 2B) and determining the overall mod30 cost (e.g., using EQ. 3A or EQ. 3B), the PCI allocator 200 may determine the overall cost for each PCI(x) available for allocation to the source eNB 120S using EQ. 1. Thus, the cost_mod3_mod30(x) for each available PCI(x) is equal to a summation of the corresponding overall mod3 cost and the corresponding overall mod 30 cost. Thereafter, the PCI allocator 200 determines which value of PCI(x) available for allocation to the source eNB 200S has a minimum overall cost and allocates the PCI(x) 202 having the minimum overall cost to the source eNB 120S. In some examples, the PCI allocator 200 randomly selects the PCI(x) 202 out of multiple PCIs having the same minimum overall cost to the source eNB 120S.

In some implementations, the PCI allocator 200 additionally optimizes the SSS sequence assigned to the source base station 120S. Here, for each neighboring eNB 120i having a same PCI(x) under mod30, the PCI allocator 200 may determine which neighboring eNB 120i includes a minimum pairwise Euclidean distance from the source eNB 120S, and may then determine which PCI(x) available for allocation to the source eNB 120S under mod30 is associated with the neighboring eNB 120i having a greatest minimum pairwise Euclidean distance from the source eNB 120S. Thereafter, the PCI allocator 200 may allocate the PCI under mod30 associated with the greatest minimum pairwise Euclidean distance to the source eNB 120s. In other words, the PCI allocator 200 selects the PCI(x) under mod30 for allocation to the source eNB 120S that maximizes the minimum pairwise Euclidean distance of the nearest neighboring eNB 120i having the same PCI(x) under mod30, and thereby optimizes the SSS sequence assigned to the source eNB 120S.

In some implementations, the PCI allocator 200 selects the PCI(x) for allocation to the source eNB 120S by considering the mod3 costs and the mod30 costs separately in a hierarchical manner. More specifically, the PCI allocator 200 may first consider each PCI(x) available for allocation to the source eNB 120S under mod3, determine which of these PCIs under mod3 has a minimum overall mod3 cost, and allocate the PCI(x/ under mod3 having the minimum overall mod3 cost to the source eNB 120S. For example, the PCI allocator 200 may use one of EQ. 2A or EQ. 2B to determine the mod3 cost for each neighboring eNB 120$i$ having the same PCI(x) under mod3 and determine the overall mod3 cost as a summation of the mod3 costs of the neighboring eNBs 120$i$ having the same PCI under mod3.

Once the PCI(x) under mod3 has been selected and allocated to the source eNB 120S, the PCI allocator 200 may now choose the PCI(x) under mod30 associated a minimum overall mod30 cost for allocation to the source eNB 120S. In some examples, the PCI allocator 200 determines a reduced set of PCIs available for allocation to the source eNB 120S under mod30 based on the PCI(x) under mod3 previously allocated to the source eNB 120S. For instance, the previously allocated PCI(x) under mod3 is operative as a precondition for identifying the reduced set of PCIs available for allocation to the eNB 120S under mod30. Accordingly, the allocating of the PCI(x) under mod3 reduces the number of PCIs available for allocation under mod30 from thirty PCIs to less than thirty PCIs, e.g., ten PCIs under mod30. In some examples, for each PCI(x) under mod30 from the reduced set of PCIs available for allocation to the source eNB 120S under mod30, the PCI allocator 200 uses one of EQ. 3A or EQ. 3B to determine a mod30 cost for each neighboring eNB 120$i$ having the same PCI(x) under mod30, and determine an overall mod30 cost as a summation of the mod30 costs of the neighboring eNBs 120$i$ having the same PCI(x) under mod30. After determining the overall mod30 costs for each PCI(x) mod 30 from the reduced set in EQ. 3A or EQ. 3B, the PCI allocator 200 may determine which PCI(x) under mod30 from the reduced set has a minimum overall mod30 cost, and thereafter, allocate the PCI(x) under mod 30 having the minimum overall mod30 cost to the source eNB 120S.

Figure 3:
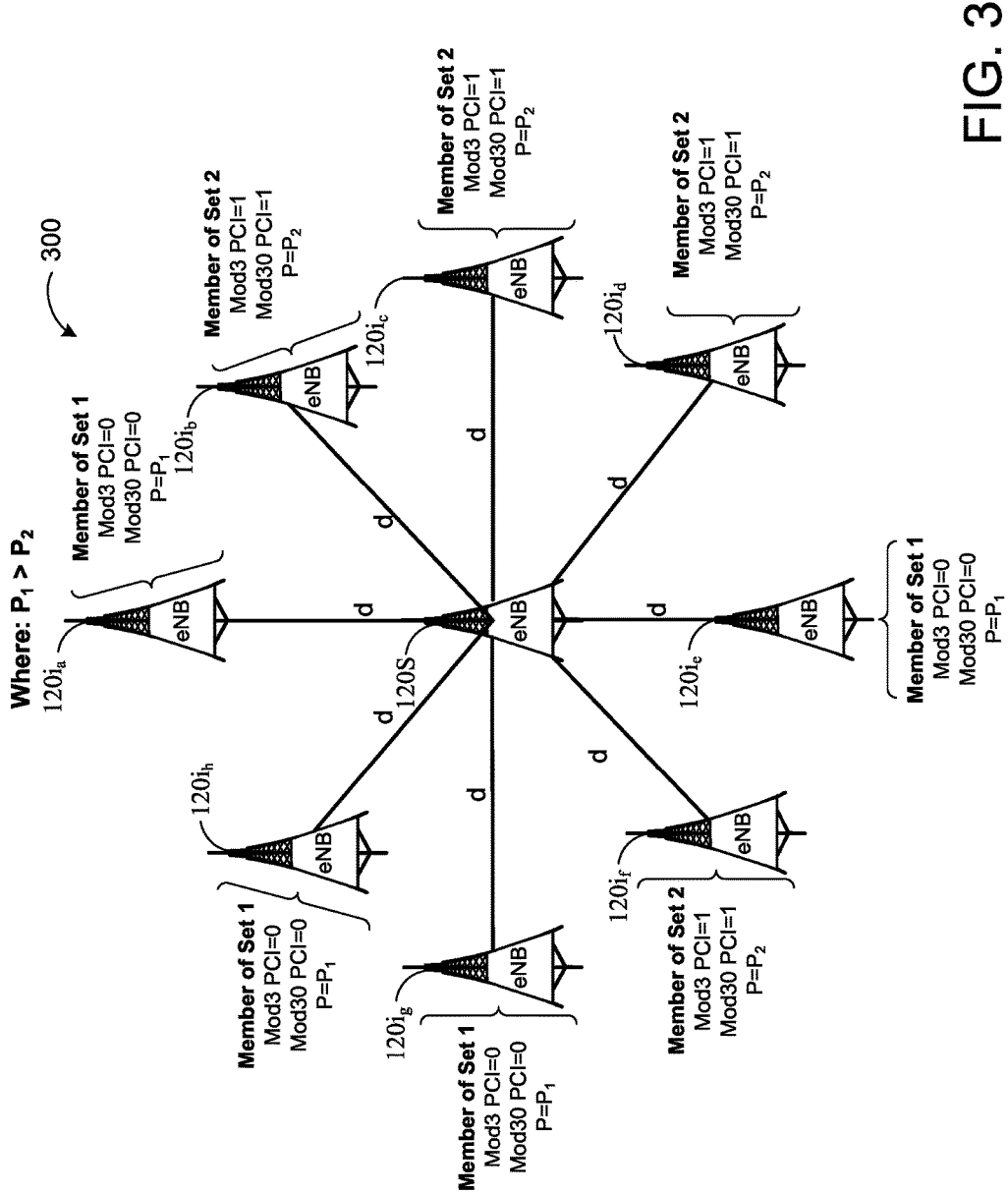
FIG. 3 is a schematic view of an example network environment including a source base station and multiple base stations equidistant from the source base station.

FIG. 3 provides an example network environment 300 including a source eNB 120S and multiple neighboring eNBs 120$i_{a-h}$ equidistant from the source eNB 120S, i.e., each neighbor eNB 120$i$ includes the same pairwise Euclidian distance d from the source eNB 120S. A first set (Set 1) of neighboring eNBs 120$i_a$, 120$i_e$, 120$i_g$, 120$i_d$ each have a PCI(x) under mod3 equal to zero, a PCI under mod30 equal to zero, and a transmission power P equal to $P_1$. A second set (Set 2) of neighboring eNBs 120$i_b$, 120$i_c$, 120$i_d$, 120$i_f$ each have a PCI(x) under mod3 equal to one, a PCI(x) under mod30 equal to one, and a transmission power P equal to $P_2$, where $P_1$ is greater than $P_2$. In the example network environment 300, there are an equal number of neighboring eNBs 120$i$ (e.g., four) in each of the first and second sets. Accordingly, as each neighboring eNB 120$i_a$, 120$i_e$, 120$i_g$, 120$i_h$ in the first set is associated with a greater transmission power than each neighboring eNB 120$i_b$, 120$i_c$, 120$i_d$, 120$i_f$ in the second set (i.e., $P_1 > P_2$), the first set of eNBs 120$i_a$, 120$i_e$, 120$i_g$, 120$i_h$ include a higher overall mod3 cost (e.g., using EQ. 2A) and a higher overall mod30 cost (e.g., using EQ. 3A) compared to the overall mod3 and mod30 costs of the second set of eNBs 120$i_b$, 120$i_c$, 120$i_d$, 120$i_f$. Accordingly, based on EQ. 1, the second set of neighboring eNBs 120$i_b$, 120$i_c$, 120$i_d$, 120$i_f$ having the PCI(x) under mod3 and the PCI(x) under mod30 each equal to one are associated with a lower overall cost to the source eNB 120S.

FIG. 4 provides an example network environment 400 including a source eNB 120S and multiple neighboring eNBs 120$i_{a-h}$ equidistant from the source eNB 120S, i.e., each neighboring eNB 120$i$ includes the same Euclidian distance d from the source eNB 120S. A first set (Set 1) of neighboring eNBs 120$i_a$, 120$i_c$, 120$i_e$, 120$i_g$, 120$i_h$ each have a PCI(x) under mod3 equal to zero, a PCI(x) under mod30 equal to zero, and a transmission power P equal to $P_1$. A second set (Set 2) of neighboring eNBs 120$i_b$, 120$i_d$, 120$i_f$ each have a PCI(x) under mod3 equal to one, a PCI(x) under mod30 equal to one, and a transmission power P equal to $P_2$, where $P_1$ is equal $P_2$. By contrast to the example network environment 300 of FIG. 3, the example network environment 400 includes an unequal number of neighboring eNBs 120$i$ among the first and second sets, e.g., the first set includes five neighboring eNBs 120$i_a$, 120$i_c$, 120$i_e$, 120$i_g$, 120$i_h$ and the second set includes three neighboring eNBs 120$i_b$, 120$i_d$, 120$i_f$. Thus, while all of the neighboring eNBs 120$i_{a-h}$ are equidistant from the source eNB 120S and also include the same transmission power P ($P_1 = P_2$), the first set of eNBs 120$i_a$, 120$i_c$, 120$i_e$, 120$i_g$, 120$i_h$ include a higher overall mod3 cost (e.g., using EQ. 2A) and a higher overall mod30 cost (e.g., using EQ. 3A) compared to the second set of eNBs 120$i_b$, 120$i_d$, 120$i_f$ since there are a greater number of eNBs (e.g., five eNBs) in the first set. Accordingly, based on EQ. 1, the second set of neighboring eNBs 120$i_b$, 120$i_d$, 120$i_f$ having the PCI(x) under mod3 equal to one and the PCI(x) under mod30 equal to one are associated with a lower overall cost to the source eNB 120S.

Figure 5:
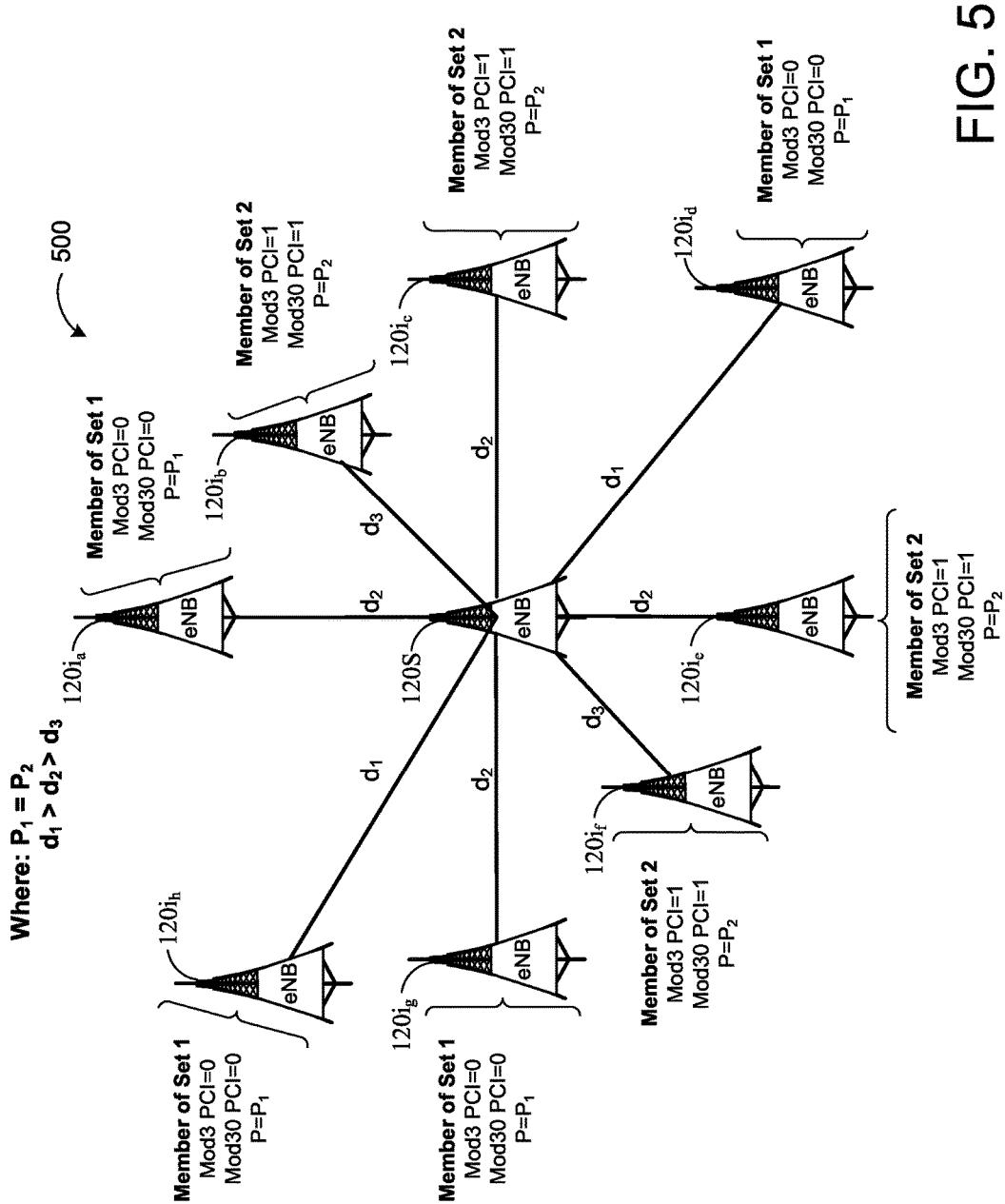
FIG. 5 is a schematic view of an example network environment including a source base station and multiple base stations of varying distances from the source base station.

FIG. 5 is an example network environment 500 including a source eNB 120S and multiple neighboring eNBs 120$i_{a-h}$ each associated with a pairwise Euclidean distance from the source eNB 120S equal to one of $d_1$, $d_2$, or $d_3$, where $d_1 > d_2 > d_3$. A first set (Set 1) of neighboring eNBs 120$i_a$, 120$i_d$, 120$i_g$, 120$i_h$ each have a PCI(x) under mod3 equal to zero, a PCI(x) under mod30 equal to zero, and a transmission power P equal to $P_1$. A second set (Set 2) of neighboring eNBs 120$i_b$, 120$i_c$, 120$i_e$, 120$i_f$ each have a PCI(x) under mod3 equal to one, a PCI(x) under mod30 equal to one, and a transmission power P equal to $P_2$, where $P_1$ is equal to $P_2$.

By contrast to the network environment 300 of FIG. 3 and the network environment 400 of FIG. 4, the network environment 500 includes varying Euclidean distances $d_1$-$d_3$ among the neighboring eNBs 120$i_{a-h}$ relative to the source eNB 120S. For instance, two of the neighboring eNBs 120$i_b$ and 120$i_f$ of the second set include the Euclidean distance $d_3$ from the source eNB 120S, while the other two neighboring eNBs 120$i_c$ and 120$i_e$ of the second set include the Euclidean distance $d_2$. On the other hand, two of the neighboring eNBs 120$i_d$ and 120$i_h$ of the first set include the Euclidean distance $d_1$ from the source eNB 120S, while the other two neighboring eNBs 120$i_a$ and 120$i_g$ of the first set include the Euclidean distance $d_2$. Thus, while there are an equal number of neighboring eNBs 120$i_{a-h}$ (e.g., four) in each of the first and second sets all having the same transmission power P ($P_1 = P_2$), the second set of eNBs 120$i_b$, 120$i_c$, 120$i_e$, 120$i_f$ include a higher overall mod3 cost (e.g., using EQ. 2A) and a higher overall mod30 cost (e.g., using EQ. 3A) compared to the first set of eNBs 120$i_a$, 120$i_d$, 120$i_g$, 120$i_h$ since the neighboring eNBs 120$i_b$ and 120$i_f$ of the second set include the shortest Euclidean distance $d_3$ from the source eNB 120S. For instance, the costs under mod3 and mod30 associated with the two neighboring eNBs 120$i_c$ and 120$i_e$ of the second set and the two neighboring 120$i_a$ and 120$i_g$ of the first set may cancel out due to the same Euclidean distance $d_2$. Accordingly, based on EQ. 1, the first set of neighboring eNBs 120$i_a$, 120$i_d$, 120$i_g$, 120$i_h$ having the PCI(x) under mod3 equal to zero and the PCI(x) under mod30 equal to zero are associated with a lower overall cost to the source eNB 120S.

Figure 6:
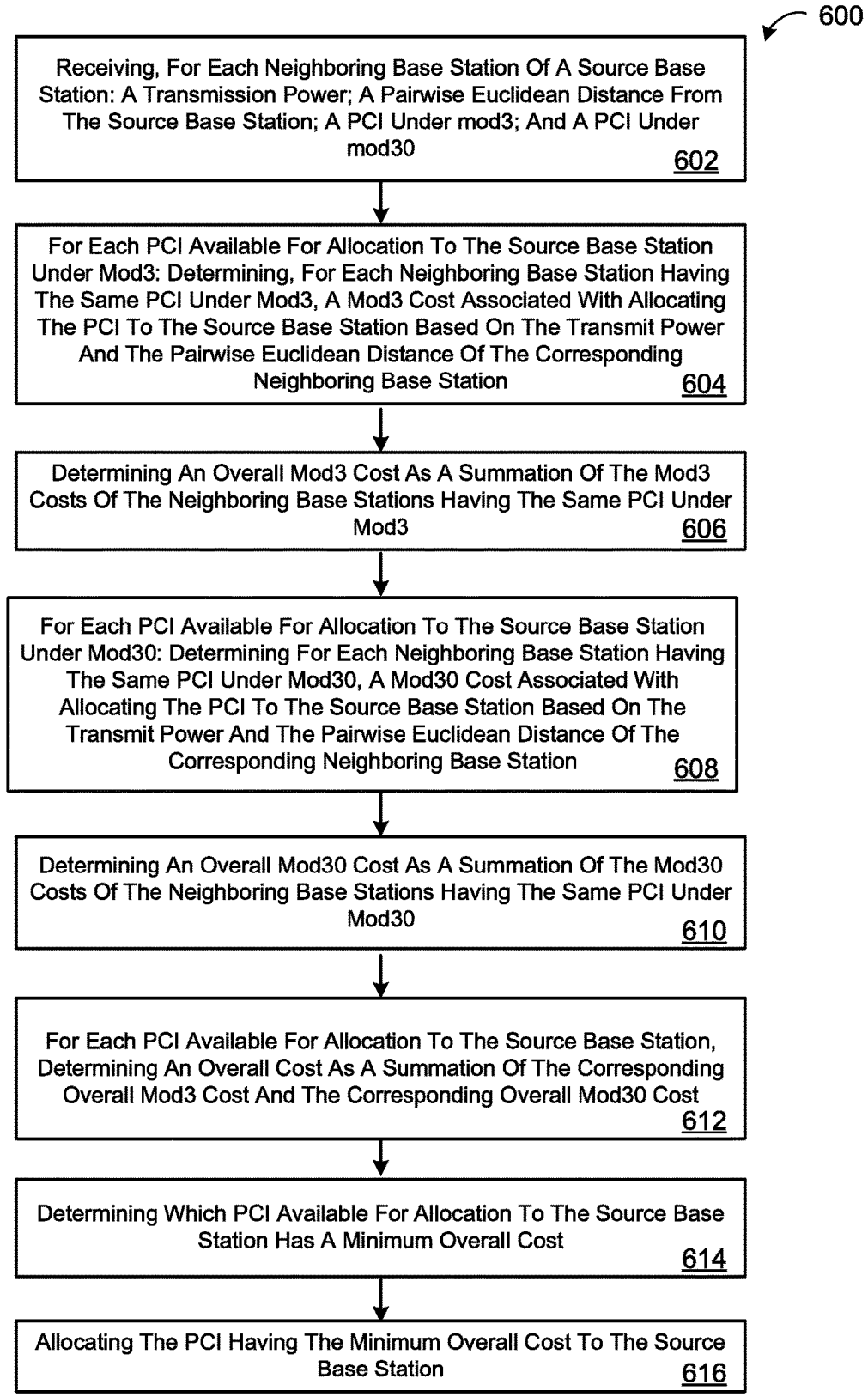
FIG. 6 is a flow chart of an example method for allocating a PCI to a source base station.

FIG. 6 illustrates an example arrangement of operations for a method 600 for allocating PCI(x) 202 having a minimum overall cost to a source base station 120. For each neighboring base station 120i of the source base station 120S, the method includes, at block 602, receiving a transmission power $P_i$; a pairwise Euclidean distance $d_i$ from the source base station 120S; a PCI under mod3; and a PCI under mod30. For instance, the PCI allocator 200 (executing on the data processing hardware 710) may receive the $P_i$, the $d_i$, the PCI under mod3, and the PCI under mod30 for each neighboring base station 120i directly from the neighboring base stations 120i, user equipment 200, and/or from the memory hardware 720. At block 604, for each PCI available for allocation to the source base station 120S under mod3, the method 600 includes, for each neighboring base station 120i having the same PCI under mod3, determining a mod3 cost associated with allocating the PCI to the source base station 120 based on the transmit power and the pairwise Euclidean distance of the corresponding neighboring base station 120i. At block 606, the method 600 further includes determining an overall mod3 cost as a summation of the mod3 costs of the neighboring base stations 120i having the same PCI under mod3.

For instance, the PCI allocator 200 use EQ. 2A or EQ. 2B to perform the operations at blocks 604 and 606.

At block 608, for each neighboring base station 120 having the same PCI under mod30, the method 600 includes determining a mod30 cost associated with allocating the PCI to the source base station 120i based on the transmit power and the pairwise Euclidean distance of the corresponding neighboring base station 120i. At block 610, the method 600 also includes determining an overall mod30 cost as a summation of the mod30 costs of the neighboring base stations 120i having the same PCI under mod30. For instance, the PCI allocator 200 may use EQ. 3A or EQ. 3B to perform the operations at blocks 608 and 610.

At block 612, for each PCI available for allocation to the source base station 120S, the method 600 includes determining an overall cost as a summation of the corresponding overall mod3 cost and the corresponding overall mod30 cost. Here, the PCI allocator 200 may determine the overall cost using EQ. 1. The method 600 further includes, at block 614, determining which PCI available for allocation to the source base station 120S has a minimum overall cost, and at block 616, allocating the PCI(x) having the minimum overall cost to the source base station 120. For example, the PCI allocator 200 may allocate the PCI(x) 202 having the minimum overall cost to the source base station 120S via the communication interface 204.

In some examples, when multiple PCIs available for allocation to the source base station 120S have the same minimum overall cost, the method 600 includes allocating a randomly selected one of the multiple PCIs having the same minimum overall cost to the source base station 120S. For each set of neighboring base stations 120i having the same PCI under mod30, the method 600 may include determining which neighboring base station 120i includes a minimum pairwise Euclidean distance from the source base station 120S. The method 600 may also include determining (i.e., using the PCI allocator 200) which PCI available for allocation to the source base station 120S under mod30 is associated with the neighboring base station 120i having a greatest minimum Euclidean distance, and then allocating the PCI under mod30 associated with the neighboring base station 120i having the greatest minimum Euclidean distance to the source base station 120S.

After allocating the PCI(x) 202 having the minimum overall cost to the source base station 120S, the method 600 may include receiving for each neighboring base station 120i of a new source base station 120S: a transmission power; a pairwise Euclidean distance from the new source base station 120; a PCI under mod3; and a PCI under mod30. For each PCI available for allocation to the new source base station 120S under mod3, the method 600 may include, for each neighboring base station 120i of the new source base station 120S having the same PCI under mod3, determining a mod3 cost associated with allocating the PCI under mod3 to the new source base station 120S based on the transmit power and the pairwise Euclidean distance of the corresponding neighboring base station 120i. The method 600 may also include determining, e.g., using EQ. 2A or EQ. 2B, an overall mod3 cost as a summation of the mod3 costs of the neighboring base stations 120 having the same PCI under mod3. The PCI allocator 200 may then determine which PCI available for allocation to the new source base station 120S under mod3 has a minimum overall mod3 cost. The method 600 may further include allocating the PCI under mod3 having the minimum overall mod3 cost to the new source base station 120.

In some implementations, the method 600 also includes determining a reduced set of PCIs available for allocation to the new source base station 120S under mod30 based on the PCI under mod3 having the minimum overall mod3 cost allocated to the new source base station 120S. For each PCI under mod30 from the reduced set of PCIs available for allocation to the new source base station 120S under mod30, the method 600 may include, for each neighboring base station 120i having the same PCI under mod30, determining a mod30 cost associated with allocating the PCI to the new source base station 120S based on the transmit power and the pairwise Euclidean distance of the corresponding neighboring base station 120. The method 600 may also include determining, e.g., using EQ. 3A or EQ. 3B, an overall mod30 costs as a summation of the mod30 costs of the neighboring base stations 120i having the same PCI under mod30. The method 600 may further include determining which PCI under mod30 from the reduced set of PCIs has a minimum overall mod30 cost and allocating the PCI under mod30 having the minimum overall mod30 cost to the new source base station 120S. The source base station 120S may include a three-sector site providing three cells directed to different directions. The source base station 120S may include one of a two-sector site or a single-sector site.

Figure 7:
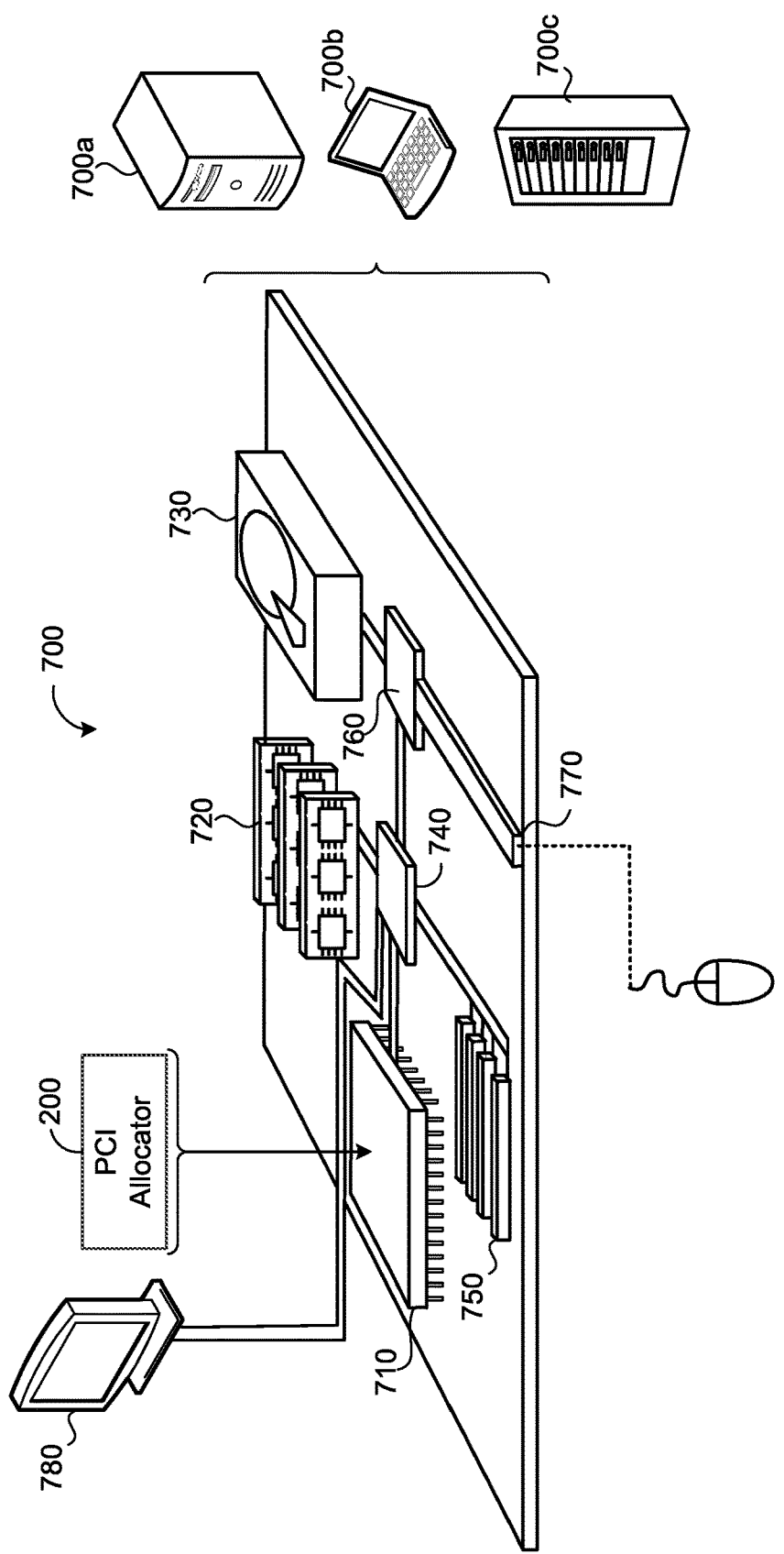
FIG. 7 is a schematic view of an example computing device.

FIG. 7 is schematic view of an example computing device 700 (e.g., data processing hardware) that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. Thus, the processor 710 is associated with data processing hardware that may execute the PCI allocator 200. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 (e.g. memory hardware) is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, for each neighboring base station of a source base station:
 a transmission power;
 a pairwise Euclidean distance from the source base station; and
 a physical cell identification (PCI) under a modulo of base sequence group number;
for each PCI available for allocation to the source base station under the modulo of base sequence group number:
 for each neighboring base station having the same PCI under the modulo of base sequence group number, determining, by the data processing hardware, a modulo cost associated with allocating the PCI to the source base station based on the transmit power and the pairwise Euclidean distance of the corresponding neighboring base station; and
 determining, by the data processing hardware, an overall modulo cost as a summation of the modulo costs of the neighboring base stations having the same PCI under the modulo of base sequence group number;
determining, by the data processing hardware, which PCI available for allocation to the source base station under the modulo of base sequence group number has a minimum overall modulo cost; and
allocating, by the data processing hardware, the PCI having the minimum overall modulo cost to the source base station.

2. The method of claim 1, wherein determining the overall modulo cost as the summation of the modulo costs of the neighboring base stations having the same PCI under the modulo of base sequence group number further comprises calculating:

$$\text{cost\_mod } n(x) = \Sigma_{i \in \Delta_x} P_i * d_i^{-2},$$

where cost_mod n is the corresponding overall modulo cost, n is a number of base sequence group number, x is the corresponding PCI under the modulo of base sequence group number, i is the corresponding neighboring base station, $\Delta_x$ is a set of the neighboring base stations having the corresponding PCI under the modulo of base sequence group number, $P_i$ is the transmit power of the corresponding neighboring base station, and $d_i$ is the pairwise Euclidean distance of the corresponding neighboring base station.

3. The method of claim 1, wherein determining the overall modulo cost as the summation of the modulo costs of the neighboring base stations having the same PCI under the modulo of base sequence group number further comprises calculating:

$$\text{cost\_mod } n(x) = \Sigma_{i \in \Delta_x} P_i * d_i^{-2} + C_i,$$

where cost_mod n is the corresponding overall modulo cost, n is a number of base sequence group number, x is the corresponding PCI under the modulo of base sequence group number, i is the corresponding neighboring base station, $\Delta_x$ is a set of the neighboring base stations having the corresponding PCI under the modulo of base sequence group number, $P_i$ is the transmit power of the corresponding neighboring base station, $d_i$ is the pairwise Euclidean distance of the corresponding neighboring base station, and $C_i$ are additional costs associated with the corresponding neighboring base station.

4. The method of claim 1, further comprising:
when multiple PCIs available for allocation to the source base station have the same minimum overall modulo cost:
 randomly selecting, by the data processing hardware, one of the multiple PCIs having the same minimum overall modulo cost; and
 allocating, by the data processing hardware, the selected one of the multiple PCIs having the same minimum overall modulo cost to the source base station.

5. The method of claim 1, further comprising:
for each set of neighboring base stations having the same PCI under the modulo of base sequence group number, determining, by the data processing hardware, which neighboring base station comprises a minimum pairwise Euclidean distance from the source base station;
determining, by the data processing hardware, which PCI available for allocation to the source base station under the modulo of base sequence group number is associated with the neighboring base station having a greatest minimum Euclidean distance; and
allocating, by the data processing hardware, the PCI under the modulo of base sequence group number associated with the neighboring base station having the greatest minimum Euclidean distance to the source base station.

6. The method of claim 1, wherein the source base station comprises a three-sector site providing three cells directed to different directions.

7. The method of claim 1, wherein the source base station comprises one of a two-sector site or a single-sector site.

8. A network system comprising:
a network comprising a source base station and neighboring base stations of the source base station;
data processing hardware in communication with the source base station; and
memory hardware in communication with the data processing hardware, the memory hardware storing instructions that when executing on the data processing hardware cause the data processing hardware to perform operations comprising:
 receiving for each neighboring base station of a source base station:
  a transmission power;
  a pairwise Euclidean distance from the source base station; and
  a physical cell identification (PCI) under a modulo of base sequence group number;
 for each PCI available for allocation to the source base station under the modulo of base sequence group number:
  for each neighboring base station having the same PCI under the modulo of base sequence group number, determining a modulo cost associated with allocating the PCI to the source base station based on the transmit power and the pairwise Euclidean distance of the corresponding neighboring base station; and determining an overall modulo cost as a summation of the modulo costs of the neighboring base stations having the same PCI under the modulo of base sequence group number;

determining which PCI available for allocation to the source base station under the modulo of base sequence group number has a minimum overall modulo cost; and allocating the PCI having the minimum overall modulo cost to the source base station.

9. The network system of claim 8, wherein determining the overall modulo cost as the summation of the modulo costs of the neighboring base stations having the same PCI under the modulo of base sequence group number further comprises calculating:

$$\text{cost\_mod } n(x) = \Sigma_{i \in \Delta_x} P_i * d_i^{-2},$$

where cost_mod n is the corresponding overall modulo cost, n is a number of base sequence group number, x is the corresponding PCI under the modulo of base sequence group number, i is the corresponding neighboring base station, $\Delta_x$ is a set of the neighboring base stations having the corresponding PCI under the modulo of base sequence group number, $P_i$ is the transmit power of the corresponding neighboring base station, and $d_i$ is the pairwise Euclidean distance of the corresponding neighboring base station.

10. The network system of claim 8, wherein determining the overall modulo cost as the summation of the modulo costs of the neighboring base stations having the same PCI under the modulo of base sequence group number further comprises calculating:

$$\text{cost\_mod } n(x) = \Sigma_{i \in \Delta_x} P_i * d_i^{-2} + C_i,$$

where cost_mod n is the corresponding overall modulo cost, n is a number of base sequence group number, x is the corresponding PCI under the modulo of base sequence group number, i is the corresponding neighboring base station, $\Delta_x$ is a set of the neighboring base stations having the corresponding PCI under the modulo of base sequence group number, $P_i$ is the transmit power of the corresponding neighboring base station, $d_i$ is the pairwise Euclidean distance of the corresponding neighboring base station, and $C_i$ are additional costs associated with the corresponding neighboring base station.

11. The network system of claim 8, wherein the operations further comprise:

when multiple PCIs available for allocation to the source base station have the same minimum overall modulo cost:

randomly selecting one of the multiple PCIs having the same minimum overall modulo cost; and allocating the selected one of the multiple PCIs having the same minimum overall modulo cost to the source base station.

12. The network system of claim 8, wherein the operations further comprise:

for each set of neighboring base stations having the same PCI under the modulo of base sequence group number, determining which neighboring base station comprises a minimum pairwise Euclidean distance from the source base station;

determining which PCI available for allocation to the source base station under the modulo of base sequence group number is associated with the neighboring base station having a greatest minimum Euclidean distance; and allocating the PCI under the modulo of base sequence group number associated with the neighboring base station having the greatest minimum Euclidean distance to the source base station.

13. The network system of claim 8, wherein the source base station comprises a three-sector site providing three cells directed to different directions.

14. The network system of claim 8, wherein the source base station comprises one of a two-sector site or a single-sector site.

15. A method comprising:

receiving, at data processing hardware, for each neighboring base station of a source base station:
  a transmission power;
  a pairwise Euclidean distance from the source base station;
  a physical cell identification (PCI) under mod3; and
  a physical cell identification (PCI) under mod30;

for each PCI available for allocation to the source base station under mod3:
  for each neighboring base station having the same PCI under mod3, determining, by the data processing hardware, a mod3 cost associated with allocating the PCI to the source base station based on the transmit power and the pairwise Euclidean distance of the corresponding neighboring base station; and
  determining, by the data processing hardware, an overall mod3 cost as a summation of the mod3 costs of the neighboring base stations having the same PCI under mod3;

selecting, by the data processing hardware, a set of PCIs from the PCIs available for allocation to the source base station under mod3, the set of PCIs having the least overall mod3 costs among the remaining PCIs available for allocation to the source base station under mod3;

for each PCI available for allocation to the source base station under mod30 and within the selected set of PCIs available for allocation to the source base station under mod3:
  for each neighboring base station having the same PCI under mod30, determining, by the data processing hardware, a mod30 cost associated with allocating the PCI to the source base station based on the transmit power and the pairwise Euclidean distance of the corresponding neighboring base station; and
  determining, by the data processing hardware, an overall mod30 cost as a summation of the mod30 costs of the neighboring base stations having the same PCI under mod30;

selecting, by the data processing hardware, a PCI available for allocation to the source base station under mod30 and within the selected set of PCIs available for allocation to the source base station under mod3 having a minimum overall mod30 cost; and allocating, by the data processing hardware, the selected PCI having the minimum overall mod30 cost to the source base station.

16. The method of claim 15, wherein determining the overall mod3 cost as the summation of the mod3 costs of the neighboring base stations having the same PCI under mod3 further comprises calculating:

$$\text{cost\_mod3}(x) = \Sigma_{i \in \Delta_x} P_i * d_i^{-2},$$

where cost_mod3 is the corresponding overall mod3 cost, x is the corresponding PCI under mod3, i is the corresponding neighboring base station, $\Delta_x$ is a set of the neighboring base stations having the corresponding PCI under mod3, $P_i$ is the transmit power of the corresponding neighboring base station, and $d_i$ is the pairwise Euclidean distance of the corresponding neighboring base station.

17. The method of claim 15, wherein determining the overall mod3 cost as the summation of the mod3 costs of the neighboring base stations having the same PCI under mod3 further comprises calculating:

$$\text{cost\_mod3}(x) = \Sigma_{i \in \Delta_x} P_i * d_i^{-2} + C_i,$$

where cost_mod3 is the corresponding overall mod3 cost, x is the corresponding PCI under mod3, i is the corresponding neighboring base station, $\Delta_x$ is a set of the neighboring base stations having the corresponding PCI under mod3, $P_i$ is the transmit power of the corresponding neighboring base station, $d_i$ is the pairwise Euclidean distance of the corresponding neighboring base station, and $C_i$ are additional costs associated with the corresponding neighboring base station.

18. The method of claim 15, wherein determining the overall mod30 cost as the summation of the mod30 costs of the neighboring base stations having the same PCI under mod30 further comprises calculating:

$$\text{cost\_mod30}(x) = \Sigma_{i \in \theta_x} P_i * d_i^{-2},$$

where cost_mod30 is the corresponding overall mod30 cost, x is the corresponding PCI under mod30, i is the corresponding neighboring base station, $\theta_x$ is a set of the neighboring base stations having the corresponding PCI under mod30, $P_i$ is the transmit power of the corresponding neighboring base station, and $d_i$ is the pairwise Euclidean distance of the corresponding neighboring base station.

19. The method of claim 15, wherein determining the overall mod30 cost as the summation of the mod30 costs of the neighboring base stations having the same PCI under mod30 further comprises calculating:

$$\text{cost\_mod30}(x) = \Sigma_{i \in \theta_x} P_i * d_i^{-2} C_i,$$

where cost_mod30 is the corresponding overall mod30 cost, x is the corresponding PCI under mod30, i is the corresponding neighboring base station, $\theta_x$ is a set of the neighboring base stations having the corresponding PCI under mod30, $P_i$ is the transmit power of the corresponding neighboring base station, $d_i$ is the pairwise Euclidean distance of the corresponding neighboring base station, and $C_i$ are additional costs associated with the corresponding neighboring base station.

20. The method of claim 15, further comprising:
when multiple PCIs available for allocation to the source base station have the same minimum overall mod30 cost:
  randomly selecting, by the data processing hardware, one of the multiple PCIs having the same minimum overall mod30 cost; and
  allocating, by the data processing hardware, the selected one of the multiple PCIs having the same minimum overall mod30 cost to the source base station.

21. The method of claim 15, further comprising:
for each set of neighboring base stations having the same PCI under mod30, determining, by the data processing hardware, which neighboring base station comprises a minimum pairwise Euclidean distance from the source base station;
determining, by the data processing hardware, which PCI available for allocation to the source base station under mod30 is associated with the neighboring base station having a greatest minimum Euclidean distance; and
allocating, by the data processing hardware, the PCI under mod30 associated with the neighboring base station having the greatest minimum Euclidean distance to the source base station.

22. A network system comprising:
a network comprising a source base station and neighboring base stations of the source base station;
data processing hardware in communication with the source base station; and
memory hardware in communication with the data processing hardware, the memory hardware storing instructions that when executing on the data processing hardware cause the data processing hardware to perform operations comprising:
  receiving, at data processing hardware, for each neighboring base station of a source base station:
    a transmission power;
    a pairwise Euclidean distance from the source base station;
    a physical cell identification (PCI) under mod3; and
    a physical cell identification (PCI) under mod30;
  for each PCI available for allocation to the source base station under mod3:
    for each neighboring base station having the same PCI under mod3, determining, by the data processing hardware, a mod3 cost associated with allocating the PCI to the source base station based on the transmit power and the pairwise Euclidean distance of the corresponding neighboring base station; and
    determining, by the data processing hardware, an overall mod3 cost as a summation of the mod3 costs of the neighboring base stations having the same PCI under mod3;
  selecting, by the data processing hardware, a set of PCIs from the PCIs available for allocation to the source base station under mod3, the set of PCIs having the least overall mod3 costs among the remaining PCIs available for allocation to the source base station under mod3;
  for each PCI available for allocation to the source base station under mod30 and within the selected set of PCIs available for allocation to the source base station under mod3:
    for each neighboring base station having the same PCI under mod30, determining, by the data processing hardware, a mod30 cost associated with allocating the PCI to the source base station based on the transmit power and the pairwise Euclidean distance of the corresponding neighboring base station; and
    determining, by the data processing hardware, an overall mod30 cost as a summation of the mod30 costs of the neighboring base stations having the same PCI under mod30;
  selecting, by the data processing hardware, a PCI available for allocation to the source base station under mod30 and within the selected set of PCIs available for allocation to the source base station under mod3 having a minimum overall mod30 cost; and allocating, by the data processing hardware, the selected PCI having the minimum overall mod30 cost to the source base station.

23. The network system of claim 22, wherein determining the overall mod3 cost as the summation of the mod3 costs of the neighboring base stations having the same PCI under mod3 further comprises calculating:

$$\text{cost\_mod3}(x) = \Sigma_{i \in \Delta_x} P_i * d_i^{-2},$$

where cost_mod3 is the corresponding overall mod3 cost, x is the corresponding PCI under mod3, i is the corresponding neighboring base station, $\Delta_x$ is a set of the neighboring base stations having the corresponding PCI under mod3, $P_i$ is the transmit power of the corresponding neighboring base station, and $d_i$ is the pairwise Euclidean distance of the corresponding neighboring base station.

24. The network system of claim 22, wherein determining the overall mod3 cost as the summation of the mod3 costs of the neighboring base stations having the same PCI under mod3 further comprises calculating:

$$\text{cost\_mod3}(x) = \Sigma_{i \in \Delta_x} P_i * d_i^{-2} + C_i,$$

where cost_mod3 is the corresponding overall mod3 cost, x is the corresponding PCI under mod3, i is the corresponding neighboring base station, $\Delta_x$ is a set of the neighboring base stations having the corresponding PCI under mod3, $P_i$ is the transmit power of the corresponding neighboring base station, $d_i$ is the pairwise Euclidean distance of the corresponding neighboring base station, and $C_i$ are additional costs associated with the corresponding neighboring base station.

25. The network system of claim 22, wherein determining the overall mod30 cost as the summation of the mod30 costs of the neighboring base stations having the same PCI under mod30 further comprises calculating:

$$\text{cost\_mod30}(x) = \Sigma_{i \in \theta_x} P_i * d_i^{-2},$$

where cost_mod30 is the corresponding overall mod30 cost, x is the corresponding PCI under mod30, i is the corresponding neighboring base station, $\theta_x$ is a set of the neighboring base stations having the corresponding PCI under mod30, $P_i$ is the transmit power of the corresponding neighboring base station, and $d_i$ is the pairwise Euclidean distance of the corresponding neighboring base station.

26. The network system of claim 22, wherein determining the overall mod30 cost as the summation of the mod30 costs of the neighboring base stations having the same PCI under mod30 further comprises calculating:

$$\text{cost\_mod30}(x) = \Sigma_{i \in \theta_x} P_i * d_i^{-2} + C_i,$$

where cost_mod30 is the corresponding overall mod30 cost, x is the corresponding PCI under mod30, i is the corresponding neighboring base station, $\theta_x$ is a set of the neighboring base stations having the corresponding PCI under mod30, $P_i$ is the transmit power of the corresponding neighboring base station, $d_i$ is the pairwise Euclidean distance of the corresponding neighboring base station, and $C_i$ are additional costs associated with the corresponding neighboring base station.

27. The network system of claim 22, wherein the operations further comprise:

when multiple PCIs available for allocation to the source base station have the same minimum overall mod30 cost:

randomly selecting one of the multiple PCIs having the same minimum overall mod30 cost; and allocating the selected one of the multiple PCIs having the same minimum overall mod30 cost to the source base station.

28. The network system of claim 22, wherein the operations further comprise:

for each set of neighboring base stations having the same PCI under mod30, determining which neighboring base station comprises a minimum pairwise Euclidean distance from the source base station;

determining which PCI available for allocation to the source base station under mod30 is associated with the neighboring base station having a greatest minimum Euclidean distance; and allocating the PCI under mod30 associated with the neighboring base station having the greatest minimum Euclidean distance to the source base station.

29. The network system of claim 22, wherein the source base station comprises a three-sector site providing three cells directed to different directions.

30. The network system of claim 22, wherein the source base station comprises one of a two-sector site or a single-sector site.

* * * * *